(12) United States Patent
Takeuchi et al.

(10) Patent No.: US 9,090,016 B2
(45) Date of Patent: Jul. 28, 2015

(54) INJECTION MOLDING MACHINE

(71) Applicant: SUMITOMO HEAVY INDUSTRIES, LTD., Tokyo (JP)

(72) Inventors: Shigeru Takeuchi, Chiba (JP); Masahiro Hayakawa, Chiba (JP); Hiromichi Nosaka, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/172,987

(22) Filed: Feb. 5, 2014

(65) Prior Publication Data

US 2014/0227381 A1     Aug. 14, 2014

(30) Foreign Application Priority Data

Feb. 13, 2013   (JP) .................................. 2013-026039
Feb. 13, 2013   (JP) .................................. 2013-026040
Nov. 29, 2013   (JP) .................................. 2013-248190

(51) Int. Cl.
*B29C 45/83*     (2006.01)
*B29C 45/76*     (2006.01)
*B29C 45/50*     (2006.01)

(52) U.S. Cl.
CPC .................. *B29C 45/83* (2013.01); *B29C 45/76* (2013.01); *B29C 2045/5048* (2013.01); *B29C 2045/5052* (2013.01); *B29C 2045/5056* (2013.01)

(58) Field of Classification Search
CPC   B29C 45/76; B29C 45/83; B29C 2045/5048; B29C 2045/5052; B29C 2045/5056

USPC .......................... 425/107, 557, 558, DIG. 115
See application file for complete search history.

(56) References Cited

U.S. PATENT DOCUMENTS 2,567,147 A * 9/1951 Cousino ......................... 425/97
4,235,575 A * 11/1980 Hehl ............................. 425/107

(Continued)

FOREIGN PATENT DOCUMENTS

JP    2000-084987    3/2000
JP    2003-011196    1/2003

(Continued)

OTHER PUBLICATIONS

Extended European Search Report dated Jun. 2, 2014.

*Primary Examiner* — Yogendra Gupta
*Assistant Examiner* — Emmanuel S Luk
(74) *Attorney, Agent, or Firm* — IPUSA, PLLC

(57) ABSTRACT

An injection molding machine includes first and second friction members, an expandable/retractable member provided in a periphery of the first and second friction members and including first and second end parts, a first attachment member attached to the first end part, and a second attachment member attached to the second end part. A lubricating oil is fed to an area between first and second friction members. A position of the second attachment member relative to the first attachment member is displaced in cooperation with a position of the second friction member relative to the first friction member. The expandable/retractable member is configured to form a reservoir space that stores the lubricating oil in the periphery of the first and second friction members. The expandable/retractable member is configured to expand/retract in correspondence with an interval between the first attachment member and the second attachment member.

8 Claims, 10 Drawing Sheets

(56) References Cited

U.S. PATENT DOCUMENTS

| | | | | |
|---|---|---|---|---|
| 4,290,701 A | * | 9/1981 | Schad | 366/77 |
| 4,693,676 A | | 9/1987 | Inaba | |
| 5,217,662 A | * | 6/1993 | Yamamura et al. | 264/40.1 |
| 6,215,969 B1 | * | 4/2001 | Nomura et al. | 399/111 |
| 6,468,449 B1 | * | 10/2002 | Fujikawa | 264/40.1 |
| 6,659,753 B2 | * | 12/2003 | Bleier et al. | 425/145 |
| 6,865,963 B2 | * | 3/2005 | Takanohashi et al. | 74/89.44 |
| 7,125,233 B2 | * | 10/2006 | Nishio | 425/145 |
| 7,351,049 B1 | * | 4/2008 | Wang | 425/107 |
| 2002/0119211 A1 | | 8/2002 | Bleier et al. | |
| 2005/0255186 A1 | * | 11/2005 | Hiraga | 425/542 |
| 2006/0188597 A1 | | 8/2006 | Chang | |
| 2007/0039458 A1 | * | 2/2007 | Hoshino et al. | 91/463 |
| 2010/0034913 A1 | | 2/2010 | Grunitz et al. | |
| 2012/0172733 A1 | * | 7/2012 | Park | 600/490 |

FOREIGN PATENT DOCUMENTS

| | | |
|---|---|---|
| JP | 2003-035397 | 2/2003 |
| JP | 2011-183705 | 9/2011 |

* cited by examiner

INJECTION MOLDING MACHINE

RELATED APPLICATION

The present application is based on and claims the benefit of Japanese Priority Application Nos. 2013-26039, 2013-26040 and 2013-248190, filed on Feb. 13, 2013, and Nov. 29, 2013, respectively, the entire contents of which are hereby incorporated by reference.

FIELD

The present invention is related to an injection molding machine.

BACKGROUND

An injection molding machine includes a friction member such as a ball screw shaft or a ball screw nut. Generally, grease is used for lubrication between friction members. Grease, which is formed into a semisolid state by mixing lubricating oil with a thickener, can be easily retained between friction members.

SUMMARY

According to an aspect of the present invention, there is provided an injection molding machine that includes first and second friction members, an expandable/retractable member provided in a periphery of the first and second friction members and including first and second end parts, a first attachment member attached to the first end part, and a second attachment member attached to the second end part. A lubricating oil is fed to an area between first and second friction members. A position of the second attachment member relative to the first attachment member is displaced in cooperation with a position of the second friction member relative to the first friction member. The expandable/retractable member is configured to form a reservoir space that stores the lubricating oil in the periphery of the first and second friction members. The expandable/retractable member is configured to expand/retract in correspondence with an interval between the first and second attachment members.

DESCRIPTION OF EMBODIMENTS

Figure 1:
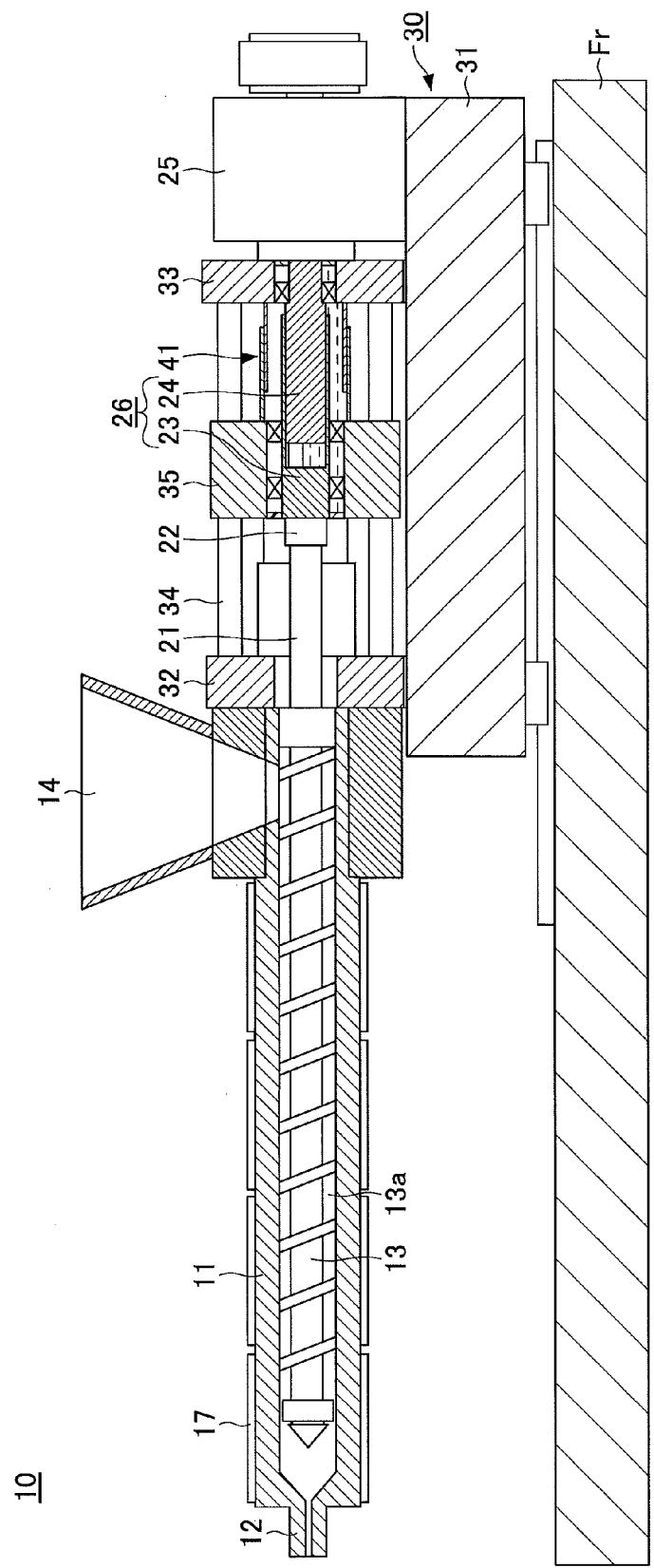
FIG. 1 is a cross-sectional view illustrating a portion of an injection molding machine according to an embodiment of the present invention.

In a case where a lubricating oil having a greater fluidity than grease is used to provide lubrication between friction members, the lubricating oil provided between the friction members tends to flow and escape therefrom.

An embodiment of the present invention provides an injection molding machine that can retain a lubricating oil between friction members.

In the following, embodiments of the present invention will be described in detail by referring to the accompanying drawings. In the drawings, similar or corresponding configurations are denoted with similar or corresponding reference numerals and are not further explained. Further, a direction in which a screw moves when a molding material is ejected from a cylinder is described as a "front side", and a direction in which a screw moves when a molding material is accumulated at a front part of a cylinder is described as a "rear side".

Figure 2:
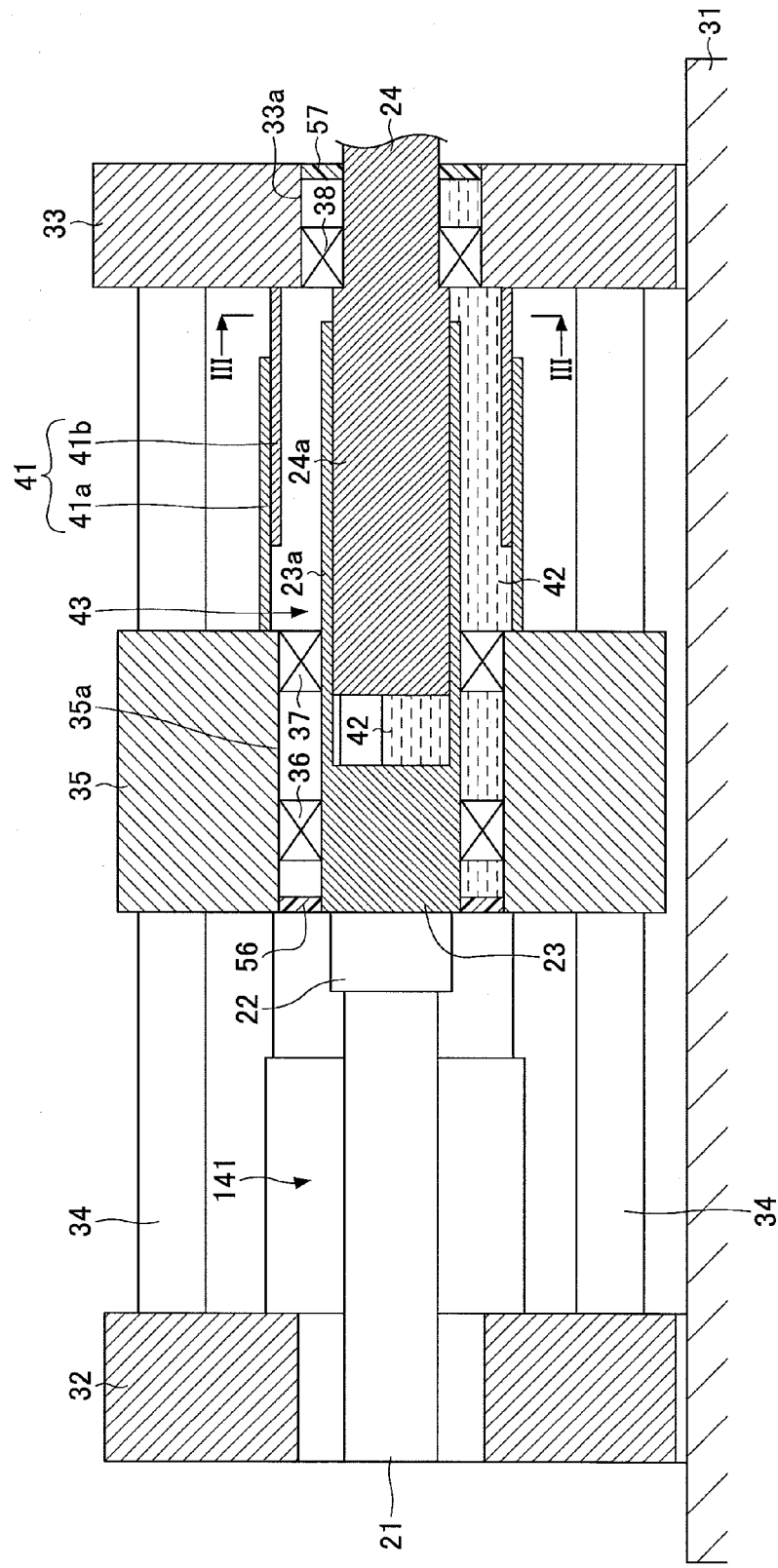
FIG. 2 is an enlarged view of a portion of FIG. 1.
Figure 3:
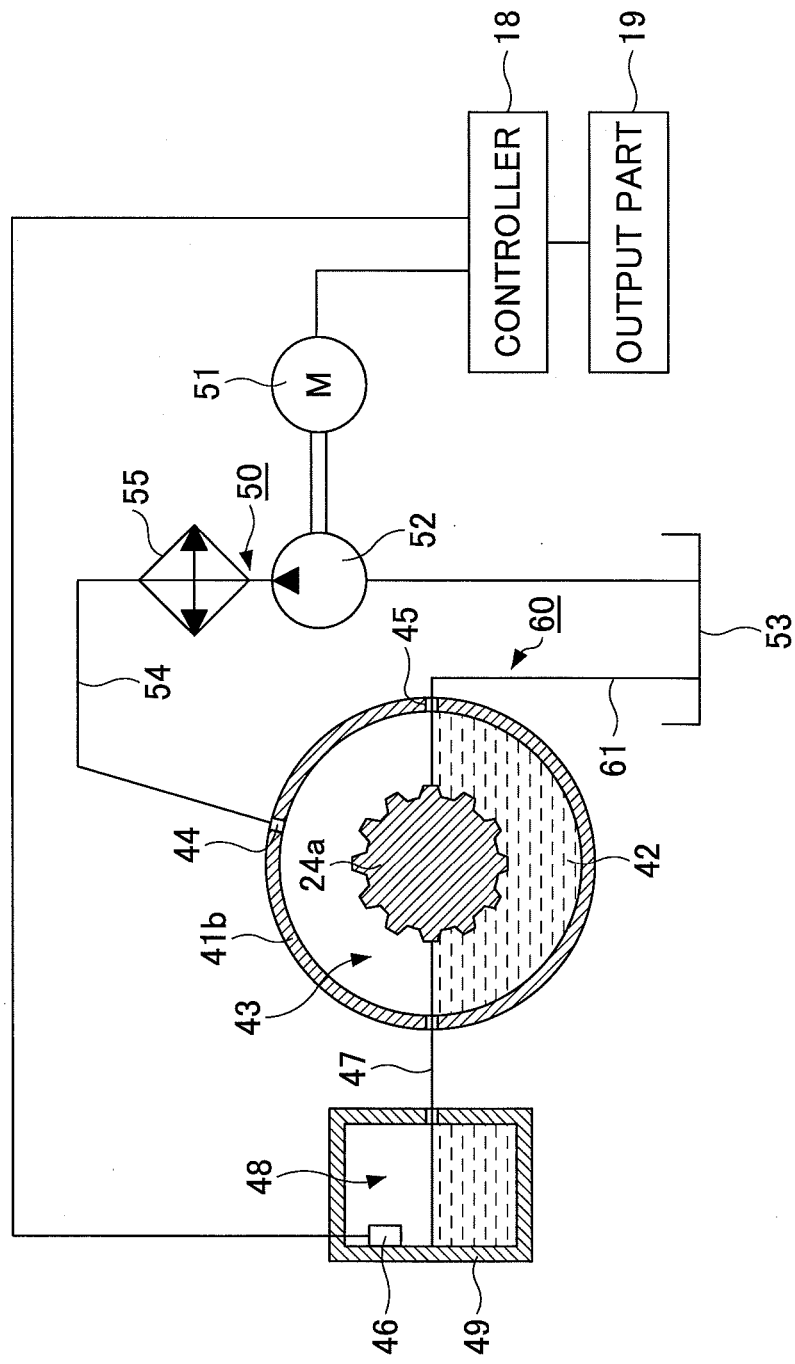
FIG. 3, which is a cross-sectional view taken along line III-III of FIG. 2, illustrates apparatuses in a periphery of a reservoir space for storing lubricating oil in a periphery of a spline coupling mechanism.
Figure 4:
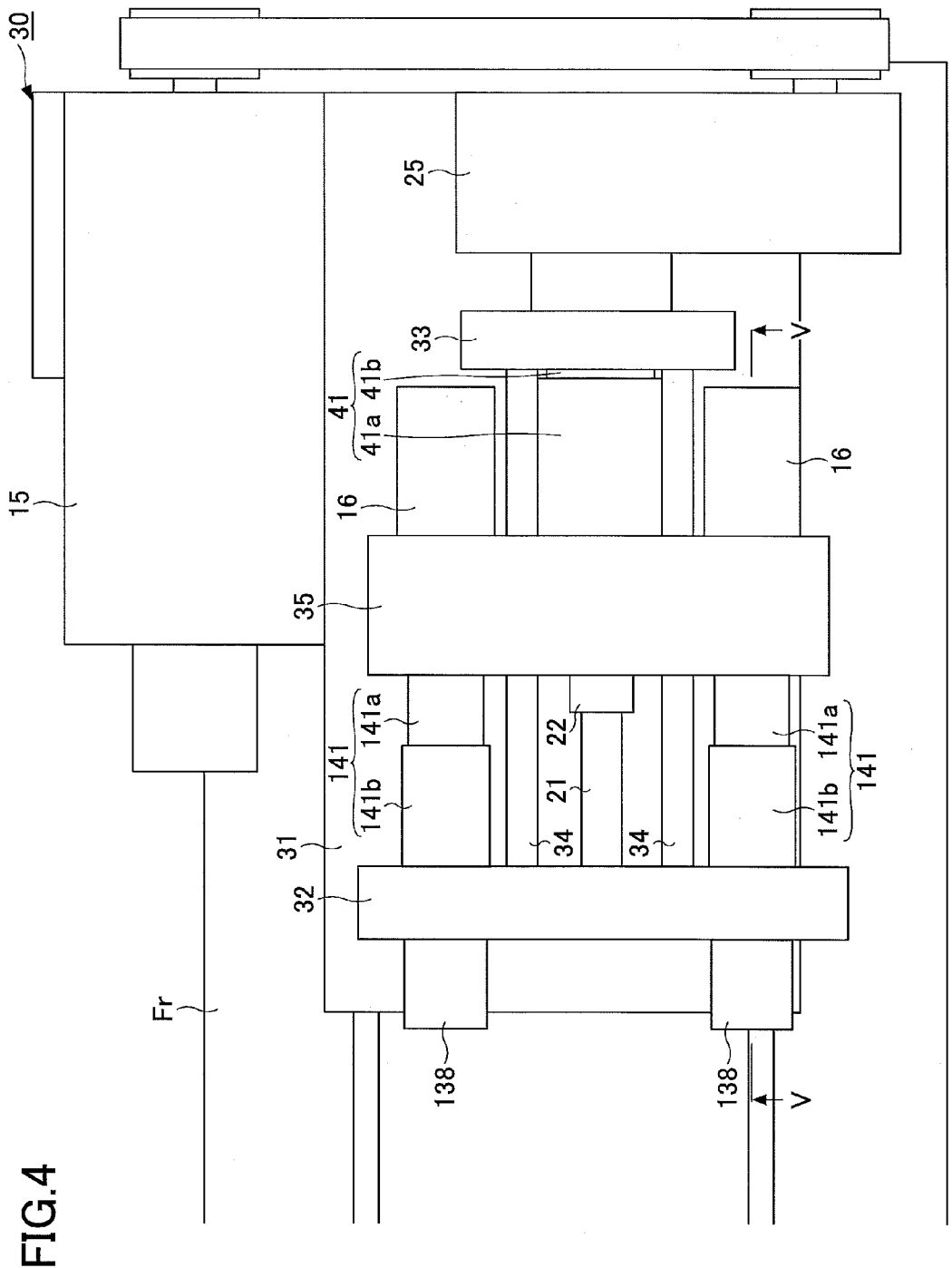
FIG. 4 is a top plan view of FIG. 2.
Figure 5:
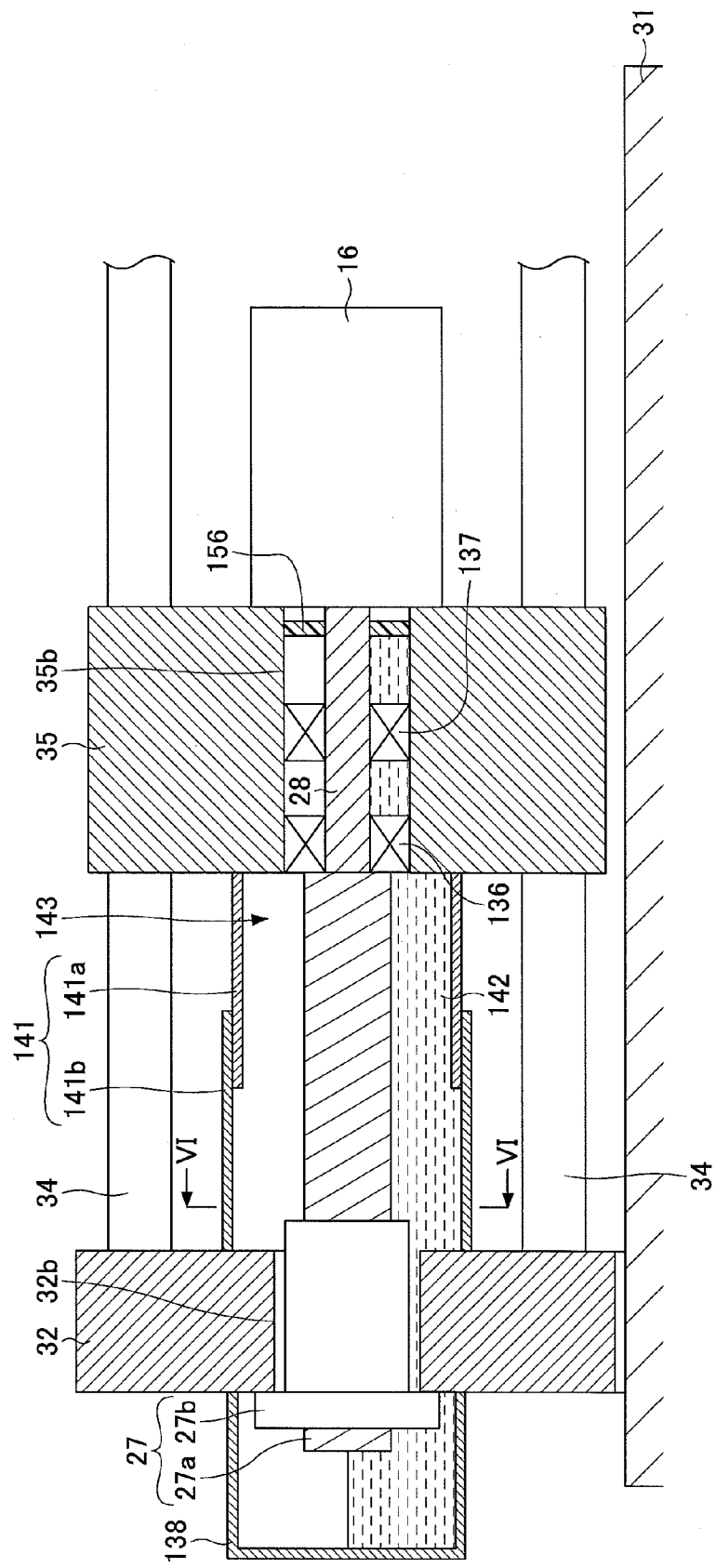
FIG. 5 is cross-sectional view taken along line V-V of FIG. 4.
Figure 6:
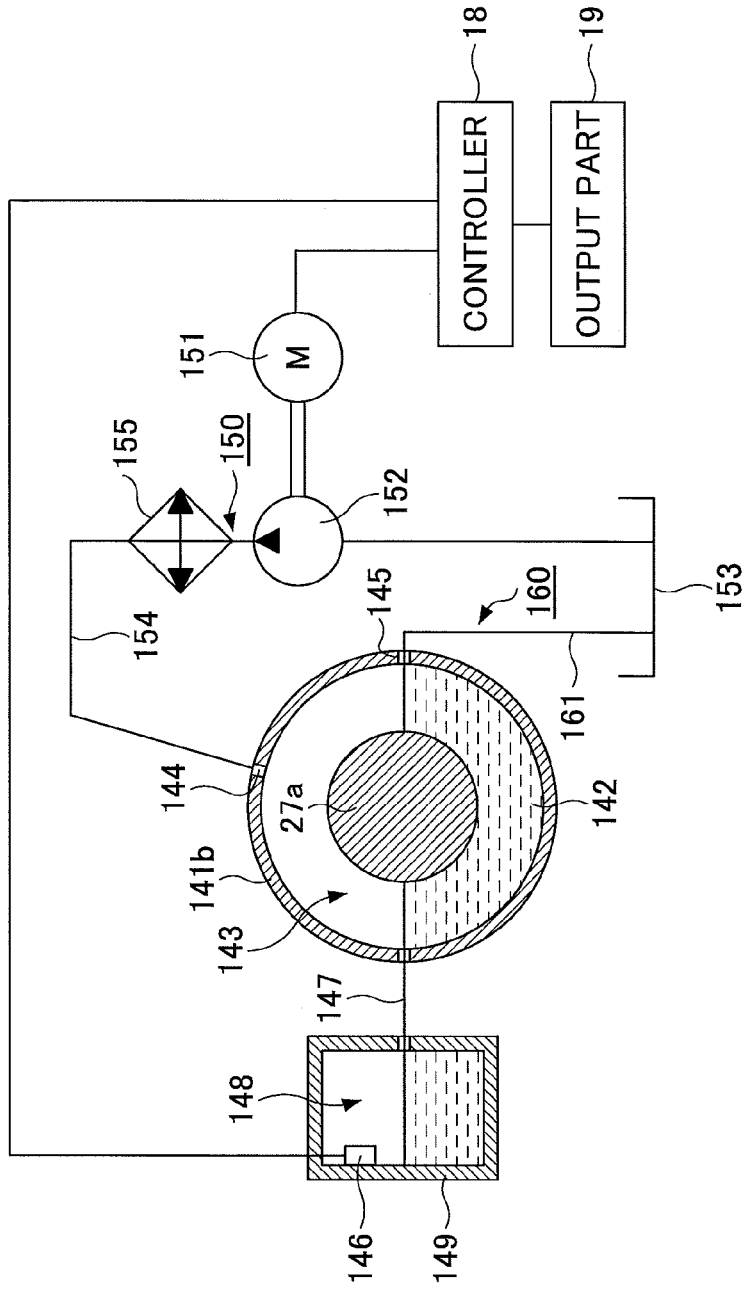
FIG. 6, which is a cross-sectional view taken along line VI-VI of FIG. 5, illustrates apparatuses in a periphery of a reservoir space for storing lubricating oil in a periphery of a ball screw mechanism.

FIG. 1 is a cross-sectional view illustrating a portion of an injection molding machine according to an embodiment of the present invention. FIG. 2 is an enlarged view of a portion of FIG. 1. FIG. 3, which is a cross-sectional view taken along line III-III of FIG. 2, illustrates apparatuses in a periphery of a reservoir space for storing lubricating oil in a periphery of a spline coupling mechanism. FIG. 4 is a top plan view of FIG. 2. FIG. 5 is cross-sectional view taken along line V-V of FIG. 4. FIG. 6, which is a cross-sectional view taken along line VI-VI of FIG. 5, illustrates apparatuses in a periphery of a reservoir space for storing lubricating oil in a periphery of a ball screw mechanism.

As illustrated in FIG. 1 and FIG. 4, an injection molding machine 10 includes, for example, a cylinder 11, a screw 13 provided in the cylinder 11, a plasticizing motor 15 serving as a rotation drive part that rotates the screw 13, and an injection motor 16 serving as a movement drive part that advances the screw 13.

A hopper 14 is provided at a rear part of the cylinder 11 as a material supply part for supplying a molding material (for example, resin pellets) into the cylinder 11. Although the material supply part of the present embodiment is configured to include the hopper 14, the material supply part may be configured to include, for example, a feed screw that can adjust a supply amount.

The screw 13 is rotatably and advanceably/retractably provided inside the cylinder 11. A spiral-like groove 13a is formed in the screw 13. A molding material is fed into the groove 13 from the hopper 14. When the screw 13 rotates, the molding material is delivered to the front side along the spiral-like groove 13a. The groove 13a may have a constant depth. Alternatively, the groove 13a may have different depths in different areas thereof.

A shaft part 21 extending to the rear side from the screw 13 is coupled to a drive shaft 23 via a coupling 22. The drive shaft 23 rotates together with the screw 13 and advances/retracts together with the screw. A rotation shaft 24 is coupled to the drive shaft 23. The screw 13, the shaft part 21, the drive shaft 23, and the rotation shaft 24 are coaxially provided in this order. Further, the drive shaft 23 and the rotation shaft 24 may constitute a rotation transmission part 26 (see FIG. 1).

The rotation transmission part 26, which is provided at a rear side of the screw 13 in an axial direction of the screw 13, transmits the rotation of the plasticizing motor 15 to the screw 13. The rotation transmission part 26 includes the rotation shaft 24 serving as a first transmission member and the drive shaft 23 serving as a second transmission member. In a passage where the rotation of the plasticizing motor 15 is transmitted to the screw 13, the rotation shaft 24 is provided toward the plasticizing motor 15, and the drive shaft 23 is provided toward the screw 13. The rotation shaft 24 and the drive shaft 23 are connected to move relative to each other.

The rotation shaft 24 rotates together with the drive shaft 23. The rotation shaft 24 permits the advancing/retracting of the drive shaft 23. For example, as illustrated in FIG. 2, a spline nut part 23a formed in the drive shaft 23 and a spline shaft part 24a formed in the rotation shaft 24 mesh with each other. For example, as illustrated in FIG. 3, the spline shaft part 24a is constituted by a rod-like part and multiple protruding parts provided in an outer periphery of the rod-like part. The spline nut part 23a is constituted by, for example, a tube-like part and multiple recess parts provided in an inner periphery of the tube-like part. Thus, the recess parts of the spline nut part 23a and the protruding parts of the spline shaft part 24a mesh with each other. The spline nut part 23a and the spline shaft part 24a constitute a spline coupling mechanism.

It is to be noted that the drive shaft 23 and the rotation shaft 24 may have a wide variety of configurations. For example, the positions of the spline shaft part 24a and the spline nut part 23a may be reversed. A spline shaft part may be formed in the drive shaft 23, and a spline nut part may be formed in the rotation shaft 24. Further, one or more protruding parts may be provided in an outer periphery of a rod-like part of the spline shaft part. Alternatively, one or more recess parts may be provided in the outer periphery of the rod-like part of the spline shaft part. In a case where one or more recess parts are provided in the outer periphery of the rod-like part of the spline shaft part, protruding parts are provided in an inner periphery of a tube-like part of the spline nut part. Further, a pin may be fixed to one of the drive shaft 23 and the rotation shaft 24, and a recess part engageable to the pin may be formed in the other of the drive shaft 23 and the rotation shaft 24. The pin, which is fixed to the one of the drive shaft 23 and the rotation shaft 24, is advanceably/retractably inserted to the recess part formed in the other of the drive shaft 23 and the rotation shaft 24.

The plasticizing motor 15 (see FIG. 4) rotates the screw 13 inside the cylinder 11. The rotation of the plasticizing motor 15 is transmitted to a speed reducer 25 via a belt or a pulley. The rotation shaft 24 is rotated by a torque corresponding to a speed reduction ratio of the speed reducer 25. The screw 13 is rotated together with the rotation axis 24. It is to be noted that a belt or a pulley need not be provided in the speed reducer 25. Alternatively, an output shaft of the plasticizing motor 15 may be coaxially coupled to the rotation shaft 24.

As illustrated in FIG. 4, the plasticizing motor 15 is fixed to a base 31. As illustrated in FIGS. 1 and 2, a front side support 32 and a rear side support 33 are fixed to the base 31. Because the base 31 causes the nozzle 12 of the cylinder 11 to contact/separate with respect to a mold unit 87 (see FIG. 7), the base 31 can advance/retract with respect to a frame Fr of the injection molding machine 10. A rear end part of the cylinder 11 is attached to the front side support 32. Multiple guide bars (for example, 4 guide bars) 34 are coupled to the front side support 32 and the rear side support 33. The guide bars 34 guide the advancing/retracting of a pressure plate 35 provided between the front side support 32 and the rear side support 33. Insertion holes are formed in the pressure plate 35 for inserting the guide bars 34 therethrough. The base 31, the front side support 32, the rear side support 33, and the guide bars 34 constitute an injection frame 30. As long as the plasticizing motor 15 is fixed to the injection frame 30, the plasticizing motor 15 may be fixed to any one of the base 31, the front side support 32, the rear side support 33, and the guide bars 34.

It is to be noted that, although the injection frame 30 is constituted by the base 31, the front side support 32, the rear side support 33, and the guide bars 34, the injection frame 30 is not limited to such configuration. For example, guide rails may be provided on the base 31 instead of the guide bars 34, so that the guide rails can guide the advancing/retracting of the pressure plate 35.

The pressure plate 35 is a movable member that can advance/retract with respect to the base 31. As illustrated in FIG. 2, the pressure plate 35 retains shaft bearings 36, 37 that rotatably support the drive shaft 23. The pressure plate 35 advance/retracts together with the drive shaft 23 with respect to the base 31.

The injection motor 16 (see FIGS. 4 and 5) moves the screw 13 inside the cylinder 11. The injection motor 16 advances/retracts the drive shaft 23, for example, by advancing/retracting the pressure plate 35 with respect to the base 31. The rotating movement of the injection motor 16 is converted to a straight-linear movement of the drive shaft by a ball screw mechanism 27 illustrated in FIG. 5. Thereby, the screw 13 is advanced/retracted together with the drive shaft 23.

The ball screw mechanism 27 is constituted by a ball screw shaft 27a and a ball screw nut 27b that is fastened to the ball screw shaft 27a. Although the ball screw shaft 27a is coaxially coupled to an output shaft of the injection motor 16, the ball screw shaft 24a may be coupled to the output shaft of the injection motor 16 by way of, for example, a belt or a pulley. The injection motor 16 is fixed to the pressure plate 35. The ball screw nut 27b is fixed to the front side support 32.

When the injection motor 16 is driven, the pressure plate 35 may be advanced/retracted by advancing/retracting the ball screw shaft 27a while rotating the ball screw shaft 27a. It is, however, to be noted that the movement of the ball screw mechanism 27 during the driving of the injection motor 16 is not limited to the movement described above. For example, when the injection motor 16 is driven, the pressure plate 35 may be advanced/retracted by rotating the ball screw shaft 27a and advancing/retracting the ball screw nut 27b. In this case, for example, the ball screw nut 27b is fixed to the pressure plate 35 whereas the injection motor 16 is fixed to the front side support 32 or the rear side support 33. Further, when the injection motor 16 is driven, the pressure plate 35 may be advanced/retracted by rotating the ball screw nut 27b and advancing/retracting the ball screw shaft 27a. In this case, for example, a shaft bearing, which rotatably supports a shaft part extending from the ball screw shaft 27a, is fixed to the pressure plate 35 whereas a shaft bearing, which rotatably supports the ball screw nut 27b, is fixed to the front side support 32 or the rear side support 33.

As illustrated in FIG. 1, the rotation transmission part 26, which is provided at a rear side of the screw 13 in its axial direction, transmits the rotation of the plasticizing motor 15 to the screw 13. The rotation transmission part 26 includes the drive shaft 23 and the rotation shaft 24 that are connected to move relative to each other. Therefore, when the drive shaft 23 is moved by driving the injection motor 16, neither the rotation shaft 24 connected to the drive shaft 23 nor the plasticizing motor 15 rotating the rotation shaft 24 need to be moved. Accordingly, compared to the related art where the injection motor moves the plasticizing motor, the energy consumption of the injection motor 16 can be reduced. Further, size reduction of the injection motor 16 can be achieved.

As illustrated in FIG. 4, multiple injection motors 16 may be provided. Further, multiple ball screw mechanisms 27 that convert the rotation of the injection motor 16 to the advancing/retracting movement of the pressure plate 35 may be provided. The multiple ball screw mechanisms 27 are symmetrically arranged in which a center of the ball screw mechanisms 27 is a center line of the screw 13. Thereby, forces that press the pressure plate 35 toward the front side are symmetrically generated around the center line of the screw 13. Thus, the screw 13 can be prevented from deforming (e.g., bending).

Figure 7:
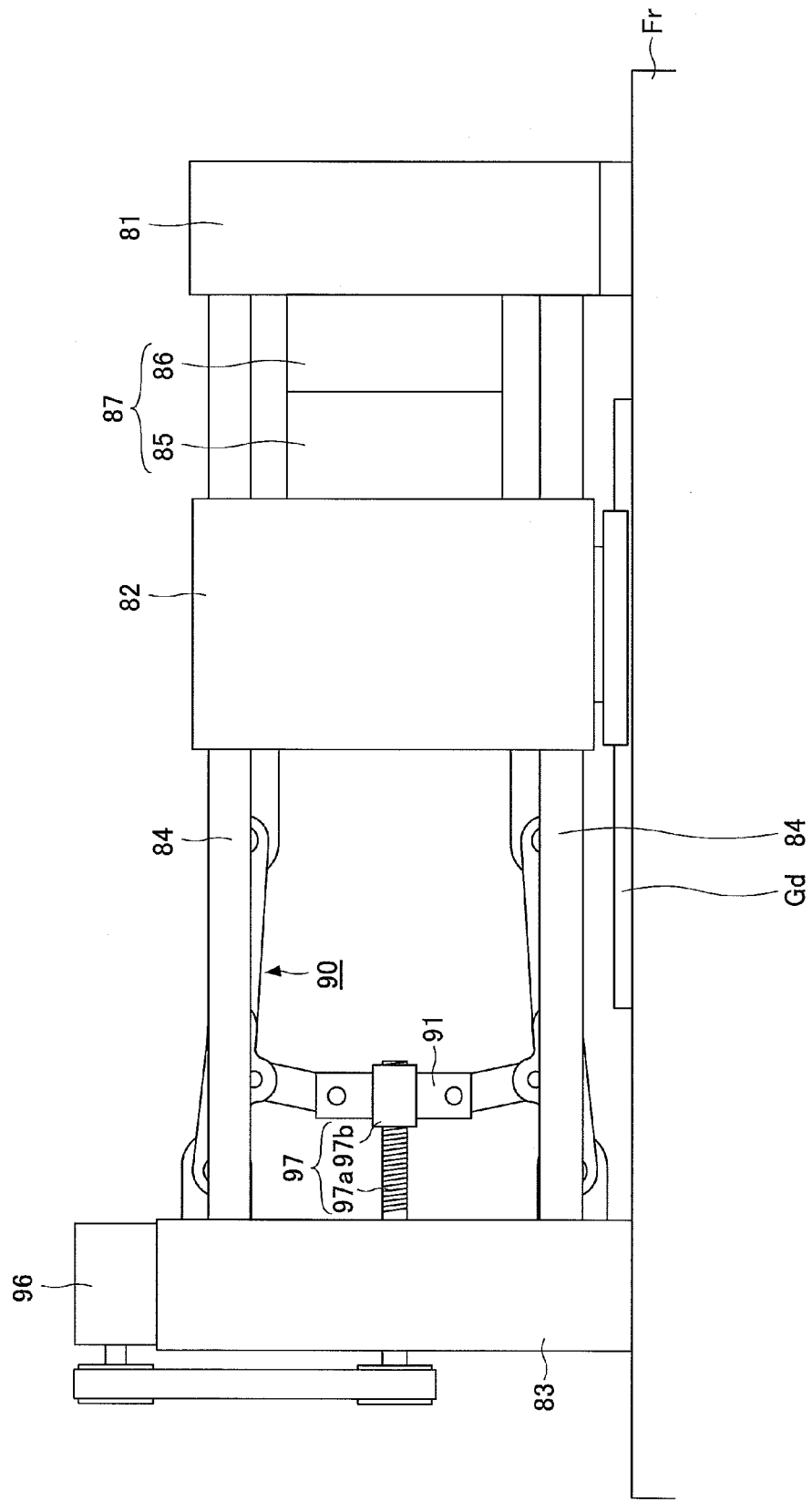
FIG. 7 is a schematic diagram illustrating a mold clamping unit of an injection molding machine according to an embodiment of the present invention.

FIG. 7 is a schematic diagram illustrating a mold clamping unit of an injection molding machine according to an embodiment of the present invention. In the following description of the mold clamping unit, a direction in which a movable platen moves during closing of a mold is described as a "front side", and a direction in which the movable platen moves during opening of a mold is described as a "rear side".

The mold clamping unit of the injection molding machine 10 includes, for example, a stationary platen 81, a movable platen 82, a toggle support 83, tie bars 84, a toggle mechanism 90, and a mold clamping motor 96.

The stationary platen 81 may be fixed to a frame Fr. The toggle support 83 is spaced apart from the stationary platen 81. The toggle support 83 and the stationary platen 81 are coupled to each other by multiple tie bars (e.g., 4 tie bars). The toggle support 83 is advancably/retractably placed on the frame Fr to allow the tie bars 84 to expand during clamping of the mold.

The movable platen 82, which is provided between the stationary platen 81 and the toggle support 83, can advance/retract along a guide Gd arranged on the frame Fr. A movable mold 85 is attached to a surface of the movable platen 82 that faces the stationary platen 81. On the other hand, a stationary mold 86 is attached to a surface of the stationary platen 81 that faces the movable platen 82. The stationary mold 86 and the movable mold 85 constitute the mold unit 87. When the movable platen 82 advances, the movable mold 85 and the stationary mold 86 contact each other. Thereby, the mold is closed. When the movable platen 82 retracts, the movable mold 85 and the stationary mold 86 separate from each other. Thereby, the mold is opened.

The toggle mechanism 90 is provided between the movable platen 82 and the toggle support 83. The toggle mechanism 90 includes, for example, a cross-head 91 being advancable/retractable with respect to the frame Fr, and multiple links that transmit a thrusting force exerted to the cross-head 91.

The mold clamping motor 96 is for actuating the toggle mechanism 90. The mold clamping motor 96 may be a servo motor. The mold clamping motor 96 actuates the toggle mechanism 90 by way of, for example, the ball screw mechanism (serving as a movement conversion part) that converts a rotating movement to a straight-linear movement.

The ball screw mechanism 97 is constituted by a ball screw shaft 97a and a ball screw nut 97b that is fastened to the ball screw shaft 97a. Although the ball screw shaft 97a is coupled to an output shaft of the mold clamping motor 96 by way of a belt or a pulley, the ball screw shaft 97a may be coaxially coupled to the output shaft of the mold clamping motor 96. A shaft bearing, which rotatably supports the ball screw shaft 97a, is retained by the toggle support 83. The ball screw nut 97b is fixed to the cross-head 91.

When the mold clamping motor 96 is driven, the ball screw shaft 97a rotates, and the ball screw nut 97b advances/retracts. In correspondence with the advancing/retracting of the ball screw nut 97b, the cross-head 91 advances/retracts. Thereby, the movable platen 82 can be moved toward or away from the stationary platen 81. It is to be noted that the movement of the ball screw mechanism 97 during the driving of the mold clamping motor 96 is not limited to the movement described above.

Next, an operation of the injection molding machine 10 is described. The injection molding machine 10 performs a mold closing process for closing the mold unit 87, a mold clamping process for clamping the mold unit 87, a filling process for allowing a molten molding material to flow into the mold unit 87 in a clamped state, a hold pressure process for applying pressure to the molding material flowed into the mold unit 87, a cooling process for solidifying the molding material inside the mold unit 87 after the hold pressure process, a plasticizing process for plasticizing a molding material for the next molding product, a mold opening process for opening the mold unit 87, and an ejecting process for ejecting a molding product from the mold unit 87 after the mold opening process. By repeating these processes, the injection molding machine 10 can repetitively manufacture molding products. The plasticizing process may be performed during the cooling process, so that a molding cycle can be shortened.

In the plasticizing process, the plasticizing motor 15 is driven to rotate the screw 13 and forwardly deliver a molding material fed into the spiral-like groove 13a of the screw 13. Multiple band heaters 17 are provided in the outer periphery of the cylinder 11. The heat of the multiple band heaters 17 that is transferred to the cylinder 11 gradually melts the molding material advancing into the cylinder 11. The molten molding material is delivered to the front side of the screw 13. As the molten molding material accumulates at the front part of the cylinder 11, the screw 13 is retracted.

In the plasticizing process, the injection motor 16 may be driven to apply a predetermined back pressure to the screw 13 for constraining abrupt retracting of the screw 13. When the screw 13 retracts to a predetermined position and a predetermined amount of molding material accumulates at the front side of the screw 13, the driving of the plasticizing motor 15 and the injection motor 16 is stopped.

In the filling process, the molding material accumulated at the front side of the screw 13 is ejected from the nozzle 12 provided at the front part of the cylinder 11 by advancing the screw 13 at a setting speed by driving the injection motor 16. Thereby, the molding material fills a cavity space inside the mold unit 87 that contacts the nozzle 12. When the screw 13 advances to a predetermined position (so-called "V/P switch position"), the hold pressure process is started. The hold pressure process may be started when the time that has elapsed from the start of the filling process reaches a predetermined time. The setting speed of the screw 13 may be a constant speed or a speed that may be changed in correspondence with the position of the screw 13 or the elapsed time.

In the hold pressure process, the injection motor 16 is driven to thrust the screw 13 with the setting pressure. Accordingly, a molding material equivalent to a shrinkage volume caused by the cooling of the molding material is provided inside a cavity space. The cooling process is started after an entrance (so-called "gate") of the cavity space is sealed by a solidified molding material for preventing the back flow of the molding material from the cavity space. The plasticizing process for plasticizing the molding material of the next molding product may be performed during the cooling process. The setting pressure of the screw 13 may be a constant pressure or a pressure that may be changed in correspondence with the elapsed time.

Next, a feature of the injection molding machine 10 is described with reference to FIGS. 2 and 3. As illustrated in FIGS. 2 and 3, the injection molding machine 10 includes an expandable/retractable member 41 that forms a reservoir space 43 for storing lubricating oil 42 in the peripheries of the rotation shaft (first friction member) 24 and the drive shaft (second friction member) 23. The first friction member is a shaft member whereas the second friction member is a hole member including an insertion hole into which the shaft member is inserted. The second friction member is coupled to the shaft member, in a manner the second friction member can be displaced in an axial direction of the shaft member.

The expandable/retractable member 41, which is provided between the rear side support (first attachment member) 33 and the pressure plate (second attachment member) 35, expands and retracts in correspondence with the space formed between the rear side support 33 and the pressure plate 35. One end part of the expandable/retractable member 41 is attached to the rear side support 33 whereas another end part of the expandable/retractable member 41 is attached to the pressure plate 35. The position of the pressure plate 35 with respect to the rear side support 33 and the position of the pressure plate 35 with respect to the drive shaft 33 are displaced cooperatively with each other.

In order to prevent scattering of the lubricating oil 42, the expandable/retractable member 41 may be formed in a cylindrical shape that encompasses peripheries of the drive shaft 23 and the rotation shaft 24. For example, the expandable/retractable member 41 may be a telescopic type. The expandable/retractable member 41 may include a moving side cylinder part 41a attached to the pressure plate 35 and a fixed side cylinder part 41b attached to the rear side support 33.

The expandable/retractable member 41 forms the reservoir space 43 between the pressure plate 35 and the rear side support 33 for storing the lubricating oil 42 in the peripheries of the drive shaft 23 and the rotation shaft 24. The lubricating oil 42 is fed between the drive shaft 23 and the rotation shaft 24 for providing lubrication between the drive shaft 23 and the rotation shaft 24. The lubricating oil 42 contacts at least a part of the drive shaft 23 or the rotation shaft 24. The lubricating oil 42 can be retained between the drive shaft 23 and the rotation shaft 24 owing to the reservoir space 43 capable of retaining the lubricating oil 42 therein.

The lubricating oil 42 in the reservoir space 43 may be fed to a sliding portion of the shaft bearings 36, 37 that rotatably support the drive shaft 23 and a sliding portion of a shaft bearing that rotatably supports the rotation shaft 24. For example, in a case of a roller bearing where a space between an inner ring and an outer ring of the roller bearing communicates with the reservoir space 43, the lubricating oil 42 is fed to a rolling member (e.g., a ball or a roller) provided between the inner and outer rings.

The drive shaft 23 is inserted into the insertion hole 35a formed in the pressure plate 35, and a space formed between a wall of the insertion hole 35a and the drive shaft 23 is sealed by a sealing member 56. The sealing member 56, which is provided at the front side of the shaft bearings 36, 37 in the drive shaft 23, prevents the lubricating oil 42 of the shaft bearings 36, 37 from flowing in a direction opposite from the reservoir space 43.

Similarly, the rotation shaft 24 is inserted into the insertion hole 33a formed in the rear side support 33, and a space formed between a wall of the insertion hole 33a and the rotation shaft 24 is sealed by a sealing member 57. The sealing member 57, which is provided at the rear side of the shaft bearing 38 of the rotation shaft 24 in the insertion hole 33a, prevents the lubricating oil 42 of the shaft bearing 38 from flowing in a direction opposite from the reservoir space 43.

As illustrated in FIG. 3, a feeding part 50 feeds the lubricating oil 42 to the reservoir space 43. The feeding part 50 includes, for example, a feeding motor 51, a feeding pump 52, a feeding tank 53, and a feeding tube 54. The feeding motor 51 drives the feeding pump 52, so that the lubricating oil 42 stored in the feeding tank 53 is delivered to the feeding tube 54 and fed to the reservoir space 43. It is to be noted that the configuration of the feeding part 50 is not limited to the configuration described above. For example, the feeding tube 54 may be omitted from the feeding part 50, so that the feeding pump 52 is directly connected to an inlet 44 of the reservoir space 43.

In a case where the inlet 44 of the reservoir space 43 is formed in the expandable/retractable member 41, the inlet 44 may be formed in the fixing side cylinder part 41b rather than the moving side cylinder part 41a. In a case where the feeding pump 52 is fixed to the injection frame 30, a positional relationship between the feeding pump 52 and the inlet 44 of the reservoir space 43 does not change during the advancing/retracting of the pressure plate 35. Therefore, the feeding pump 52 and the inlet 44 of the reservoir space 43 can be easily connected to each other. It is to be noted that the inlet 44 of the reservoir space 43 may be formed in the rear side support 33 to which the fixing side cylindrical part 41b is attached.

A discharge part 60 discharges the lubricating oil 42 outside from the reservoir space 43. The discharge part 60 may include, for example, a discharge tube 61. The discharge tube 61 allows excess lubricating oil 42 in the reservoir space 43 to be discharged naturally by gravity and return to the feeding tank 53. In a case where the volume of the reservoir space 43 changes in correspondence with the expanding/retracting of the expandable/retractable member 41, excess lubricating oil 42 is discharged naturally by gravity. Thereby, the amount of the lubricating oil 42 in the reservoir space 43 can be automatically adjusted. Because the amount of the lubricating oil 42 is automatically adjusted, the feeding part 50 may continuously feed the lubricating oil 42 to the reservoir space 43 at a predetermined flow rate.

It is to be noted that the configuration of the discharge part 60 is not limited to the configuration described above. For example, the discharge part 60 may include a discharge pump that sucks the lubricating oil 42 into the reservoir space 43 and a discharge motor that drives the discharge pump. In a case where the amount of the lubricating oil 42 inside the reservoir space 43 exceeds an upper limit, the lubricating oil 42 can be forcibly discharged from the reservoir space 43. Further, the discharge part 60 may include a collecting tank for collecting the lubricating oil 42 discharged from the reservoir space 43.

The lubricating oil 42 inside the reservoir space 43 is agitated and warmed by the movements of the drive shaft 23 and the rotation shaft 24. By discharging the lubricating oil 42 from the reservoir space 43 to the outside, heat can be carried to the outside by the discharged lubricating oil 42. Thereby, the temperature inside the reservoir space 43 can be prevented from increasing.

In a case where the lubricating oil 42 discharged from the reservoir space 43 is returned to the feeding tank 53, a cooler 55 may be provided for cooling the lubricating oil 42. For example, the cooler 55 may be provided in the feeding tube 54, so that the lubricating oil 42 can be cooled by the thermal exchange performed between the cooler 55 and the feeding tube 54. It is to be noted that the cooler 55 may be provided anywhere in a circulation path of the lubricating oil 42.

An outlet 45 of the reservoir space 43 is provided higher than a lower end of the drive shaft 23 and a lower end of the rotation shaft 24, so that at least a part of the drive shaft 23 and a part of the rotation shaft 24 is immersed in the lubricating oil 42. In a case where the outlet 45 of the reservoir space 43 is formed in the expandable/retractable member 41, the outlet 45 may be formed in the fixing side cylinder part 41b rather than the moving side cylinder part 41a. In a case where the feeding tank 53 is fixed to the injection frame 30, a positional relationship between the feeding tank 53 and the outlet 45 of the reservoir space 43 does not change during the advancing/retracting of the pressure plate 35. Therefore, the feeding tank 53 and the outlet 45 of the reservoir space 43 can be easily connected to each other. It is to be noted that, instead of forming the outlet 45 of the reservoir space 43 in the fixing side cylinder part 41b, the outlet 45 may be formed in the rear side support 33 to which the fixing side cylindrical part 41b is attached.

A detection part 46 detects the amount of the lubricating oil 42 in the reservoir space 43. Thereby, the amount of the lubricating oil 42 in the reservoir space 43 can be managed. The detection part 46 includes, for example, a liquid level sensor. The liquid level sensor may be a non-contact type level sensor or a contact type level sensor. As an example of the non-contact type level sensor, there is a liquid level sensor that transmits an ultrasonic wave to a liquid surface of the lubricating oil 42 and measures the time between transmitting the ultrasonic wave and receiving a reflected wave responsive to the transmitted ultrasonic wave. Alternatively, an electromagnetic wave such as light may be used instead of the ultrasonic wave. As an example of a contact type liquid level sensor, there is a level sensor that detects a position of a float that elevates in correspondence with the changes of a liquid surface of the lubricating oil 42.

The detection part 46 may detect the liquid level of lubricating oil 42 of the reservoir space 43 by detecting the liquid level, of the lubricating oil 42 in a detection space 48 communicating with the reservoir space 43 via a flow path 47. The detection space 48 is formed inside a detection container 49. The volume of the detection space 48 is constant. In a case where the volume of the reservoir space 43 changes along with the expanding/retracting of the expandable/retractable member 41, the liquid level of the lubricating oil 42 in the reservoir space 43 changes, and the lubricating oil 42 flows through the flow path 47. In this case, the change of the liquid level of the lubricating oil 42 in the detection space 48 is constrained by a flow resistance generated by the flow of the lubricating oil 42. Thereby, detection results of the liquid level of the lubricating oil 42 can be leveled.

The detection part 46 outputs the detection results to a controller 18. The controller 18 includes, for example, a CPU (Central Processing Unit) and a memory. The controller 18 implements various functions by using the CPU to execute a program(s) stored in, for example, the memory.

The controller 18 activates an output part 19 that outputs an alarm based on the detection results of the detection part 46. For example, in a case where the amount of the lubricating oil 42 in the reservoir space 43 exceeds a predetermined range (e.g., becomes higher than an upper limit value or becomes lower than a lower limit value), the controller 18 activates the output part 19. The alarm output from the output part 19 may take the form of, for example, an image, a letter, or a sound.

Further, the controller 18 may control the amount of the lubricating oil 42 in the reservoir space 43 based on the detection results of the detection part 46. For example, in a case where the amount of the lubricating oil 42 in the reservoir space 43 is lower than a lower limit value, the controller 18 drives the feeding motor 51 to increase the amount of the lubricating oil 42 in the reservoir space 43. Further, in a case where the amount of the lubricating oil 42 in the reservoir space 43 is greater than an upper limit value, the controller 18 drives a discharge motor (not illustrated) to reduce the amount of the lubricating oil 42 in the reservoir space 43.

Next, another feature of the injection molding machine 10 is described with reference to FIGS. 5 and 6. As illustrated in FIGS. 5 and 6, the injection molding machine 10 includes an expandable/retractable member 141 that forms a reservoir space 43 for storing lubricating oil 142 in the peripheries of the ball screw shaft (first friction member) 27a and the ball screw nut (second friction member) 27b. The first friction member is a shaft member whereas the second friction member is a hole member including an insertion hole into which the shaft member is inserted. The second friction member is coupled to the shaft member, in a manner the second friction member can be displaced in an axial direction of the shaft member.

The expandable/retractable member 141, which is provided between the front side support (first attachment member) 32 and the pressure plate (second attachment member) 35, expands and retracts in correspondence with the space formed between the front side support 32 and the pressure plate 35. One end part of the expandable/retractable member 141 is attached to the front side support 32 whereas another end part of the expandable/retractable member 141 is attached to the pressure plate 35. The position of the pressure plate 35 with respect to the front side support 32 and the position of the ball screw shaft 27a with respect to the ball screw nut 27b are displaced cooperatively with each other.

In order to prevent scattering of the lubricating oil 142, the expandable/retractable member 141 may be formed in a cylindrical shape that encompasses a peripheries of the ball screw shaft 27a and the ball screw nut 27b. For example, the expandable/retractable member 141 may be a telescopic type. The expandable/retractable member 141 may include a moving side cylinder part 141a attached to the pressure plate 35 and a fixed side cylinder part 141b attached to the front side support 32.

The expandable/retractable member 141 forms the reservoir space 143 between the pressure plate 35 and the front side support 32 for storing the lubricating oil 142 in the peripheries of the ball screw shaft 27a and the ball screw nut 27b. The lubricating oil 142 is fed between the ball screw shaft 27a and the ball screw nut 27b for providing lubrication between the ball screw shaft 27a and the ball screw nut 27b. The lubricating oil 142 contacts at least a part of the ball screw shaft 27a or the ball screw nut 27b. The lubricating oil 142 can be retained between the ball screw shaft 27a and the ball screw nut 27b owing to the reservoir space 143 capable of retaining the lubricating oil 142 therein.

The lubricating oil 142 in the reservoir space 143 may be fed to a sliding portion of the shaft bearings 136, 137 that rotatably support the shaft part 28 that connects the ball spring shaft 27a and an output axis of the injection motor 16. For example, in a case of a roller bearing where a space between an inner ring and an outer ring of the roller bearing communicates with the reservoir space 143, the lubricating oil 142 is fed to a rolling member (e.g., a ball or a roller) provided between the inner and outer rings.

The shaft part 28 is inserted into the insertion hole 35b formed in the pressure plate 35, and a space formed between a wall of the insertion hole 35b and the shaft part 28 is sealed by a sealing member 156. The sealing member 156, which is provided at the rear side of the shaft bearings 136, 137 in the shaft part 28, prevents the lubricating oil 142 of the shaft bearings 136, 137 from flowing in a direction opposite from the reservoir space 143.

The ball screw shaft 27a is inserted into the insertion hole 32b formed in the front side support 32. A cover member 138 may be provided in the front side support 32, so that the lubricating oil 142 supplied from the reservoir space 143 via the insertion hole 32b can be stored in the cover member 138.

As illustrated in FIG. 6, a feeding part 150 feeds the lubricating oil 142 to the reservoir space 143. The feeding part 150 includes, for example, a feeding motor 151, a feeding pump 152, a feeding tank 153, and a feeding tube 154. The feeding motor 151 drives the feeding pump 152, so that the lubricating oil 142 stored in the feeding tank 153 is delivered to the feeding tube 154 and fed to the reservoir space 143. It is to be noted that the configuration of the feeding part 150 is not limited to the configuration described above. For example, the feeding tube 154 may be omitted from the feeding part 150, so that the feeding pump 152 is directly connected to an inlet 144 of the reservoir space 143.

In a case where the inlet 144 of the reservoir space 143 is formed in the expandable/retractable member 141, the inlet 144 may be formed in the fixing side cylinder part 141b rather than the moving side cylinder part 141a. In a case where the feeding pump 152 is fixed to the injection frame 130, a positional relationship between the feeding pump 152 and the inlet 144 of the reservoir space 143 does not change during the advancing/retracting of the pressure plate 135. Therefore, the feeding pump 152 and the inlet 144 of the reservoir space 143 can be easily connected to each other. It is to be noted that the inlet 144 of the reservoir space 143 may be formed in the front side support 32 to which the fixing side cylindrical part 141b is attached.

A discharge part 160 discharges the lubricating oil 142 outside from the reservoir space 143. The discharge part 160 may include, for example, a discharge tube 161. The discharge tube 161 allows excess lubricating oil 142 in the reservoir space 143 to be discharged naturally by gravity and return to the feeding tank 153. In a case where the volume of the reservoir space 143 changes in correspondence with the expanding/retracting of the expandable/retractable member 141, excess lubricating oil 142 is discharged naturally by gravity. Thereby, the amount of the lubricating oil 142 in the reservoir space 143 can be automatically adjusted. Because the amount of the lubricating oil 142 is automatically adjusted, the feeding part 150 may consecutively feed the lubricating oil 142 to the reservoir space 143 at a predetermined flow rate.

It is to be noted that the configuration of the discharge part 160 is not limited to the configuration described above. For example, the discharge part 160 may include a discharge pump that sucks the lubricating oil 142 into the reservoir space 143 and a discharge motor that drives the discharge pump. In a case where the amount of the lubricating oil 142 inside the reservoir space 143 exceeds an upper limit, the lubricating oil 142 can be forcibly discharged from the reservoir space 143. Further, the discharge part 160 may include a collecting tank for collecting the lubricating oil 142 discharged from the reservoir space 143.

The lubricating oil 142 inside the reservoir space 143 is agitated and warmed by the movement of the ball screw shaft 27a. By discharging the lubricating oil 142 from the reservoir space 143 to the outside, heat can be carried to the outside by the discharged lubricating oil 142. Thereby, the temperature inside the reservoir space 143 can be prevented from increasing.

In a case where the lubricating oil 142 discharged from the reservoir space 143 is returned to the feeding tank 153, a cooler 155 may be provided for cooling the lubricating oil 142. For example, the cooler 155 may be provided in the feeding tube 154, so that the lubricating oil 142 can be cooled by the thermal exchange performed between the cooler 155 and the feeding tube 154. It is to be noted that the cooler 155 may be provided anywhere in a circulation path of the lubricating oil 142.

An outlet 145 of the reservoir space 143 is provided higher than a lower end of the ball screw shaft 27a and a lower end of the ball screw nut 27b, so that at least a part of the ball screw shaft 27a and a part of the ball screw nut 27b is immersed in the lubricating oil 142. In a case where the outlet 145 of the reservoir space 143 is formed in the expandable/retractable member 141, the outlet 145 may be formed in the fixing side cylinder part 141b rather than the moving side cylinder part 141a. In a case where the feeding tank 153 is fixed to the injection frame 30, a positional relationship between the feeding tank 153 and the outlet 145 of the reservoir space 143 does not change during the advancing/retracting of the pressure plate 35. Therefore, the feeding tank 153 and the outlet 145 of the reservoir space 143 can be easily connected to each other. It is to be noted that, instead of forming the outlet 145 of the reservoir space 143 in the fixing side cylinder part 141b, the outlet 145 may be formed in the front side support 32 to which the fixing side cylindrical part 141b is attached.

A detection part 146 detects the amount of the lubricating oil 142 in the reservoir space 143. Thereby, the amount of the lubricating oil 142 in the reservoir space 143 can be managed. The detection part 146 includes, for example, a liquid level sensor. The liquid level sensor may be a non-contact type level sensor or a contact type level sensor.

The detection part 146 may detect the liquid level of lubricating oil 142 of the reservoir space 143 by detecting the liquid level of the lubricating oil 142 in a detection space 148 communicating with the reservoir space 143 via a flow path 147. The detection space 148 is formed inside a detection container 149. The volume of the detection space 148 is constant. In a case where the volume of the reservoir space 143 changes along with the expanding/retracting of the expandable/retractable member 141, the liquid level of the lubricating oil 142 in the reservoir space 143 changes, and the lubricating oil 142 flows through the flow path 147. In this case, the change of the liquid level of the lubricating oil 142 in the detection space 148 is constrained by a flow resistance generated by the flow of the lubricating oil 142. Thereby, detection results of the liquid level of the lubricating oil 142 can be leveled.

The detection part 146 outputs the detection results to the controller 18. The controller 18 activates the output part 19 that outputs an alarm based on the detection results of the detection part 146. For example, in a case where the amount of the lubricating oil 142 in the reservoir space 143 exceeds a predetermined range (e.g., becomes higher than an upper limit value or becomes lower than a lower limit value), the controller 18 activates the output part 19. The alarm output from the output part 19 may take the form of, for example, an image, a letter, or a sound.

Further, the controller 18 may control the amount of the lubricating oil 142 in the reservoir space 143 based on the detection results of the detection part 146. For example, in a case where the amount of the lubricating oil 142 in the reservoir space 143 is lower than a lower limit value, the controller 18 drives the feeding motor 151 to increase the amount of the lubricating oil 142 in the reservoir space 143. Further, in a case where the amount of the lubricating oil 142 in the reservoir space 143 is greater than an upper limit value, the controller 18 drives a discharge motor (not illustrated) to reduce the amount of the lubricating oil 142 in the reservoir space 143.

Figure 8:
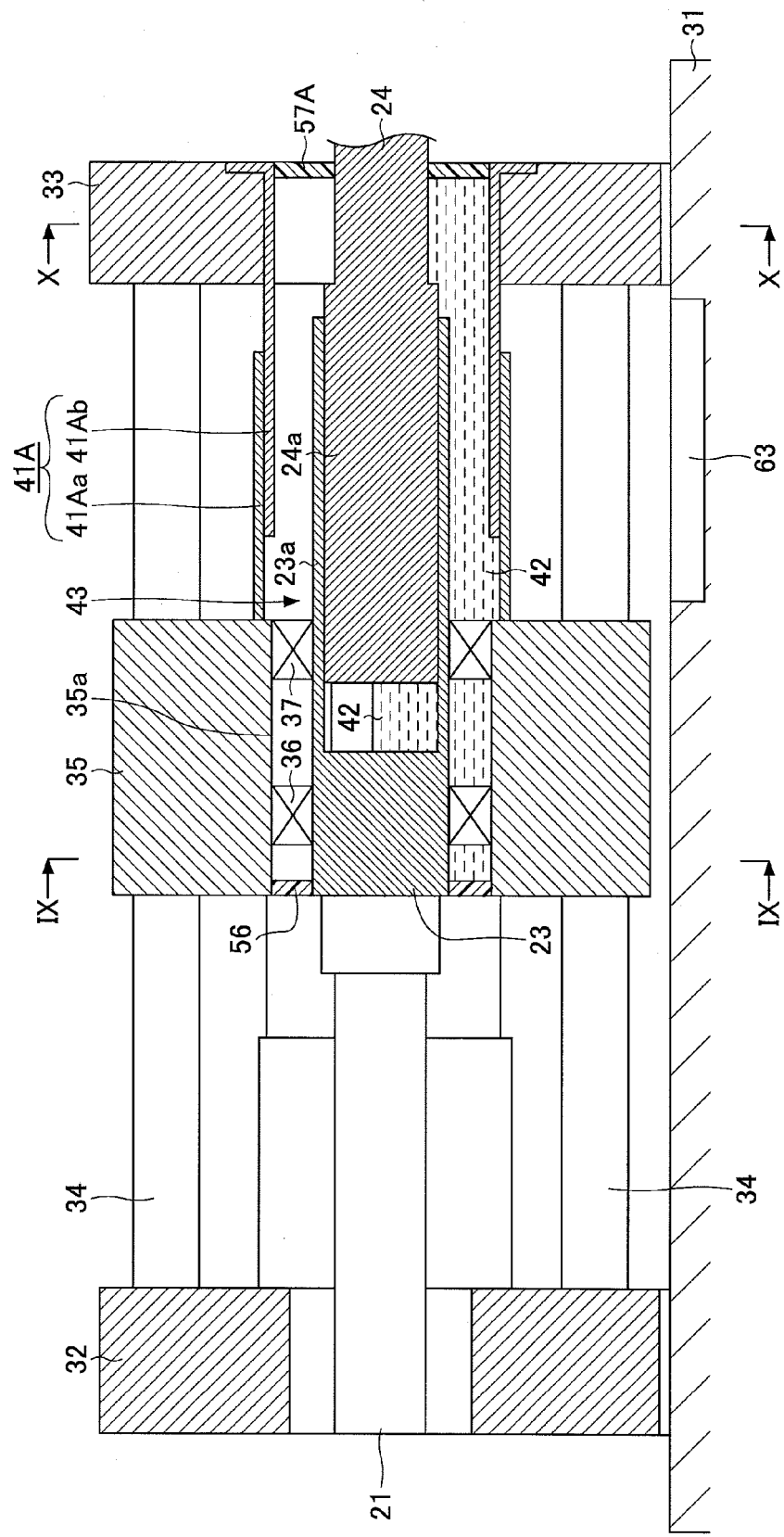
FIG. 8, which is a cross-sectional view illustrating a main part of an injection molding machine according to an embodiment of the present invention, corresponds to the cross-sectional view of FIG. 2.
Figure 9:
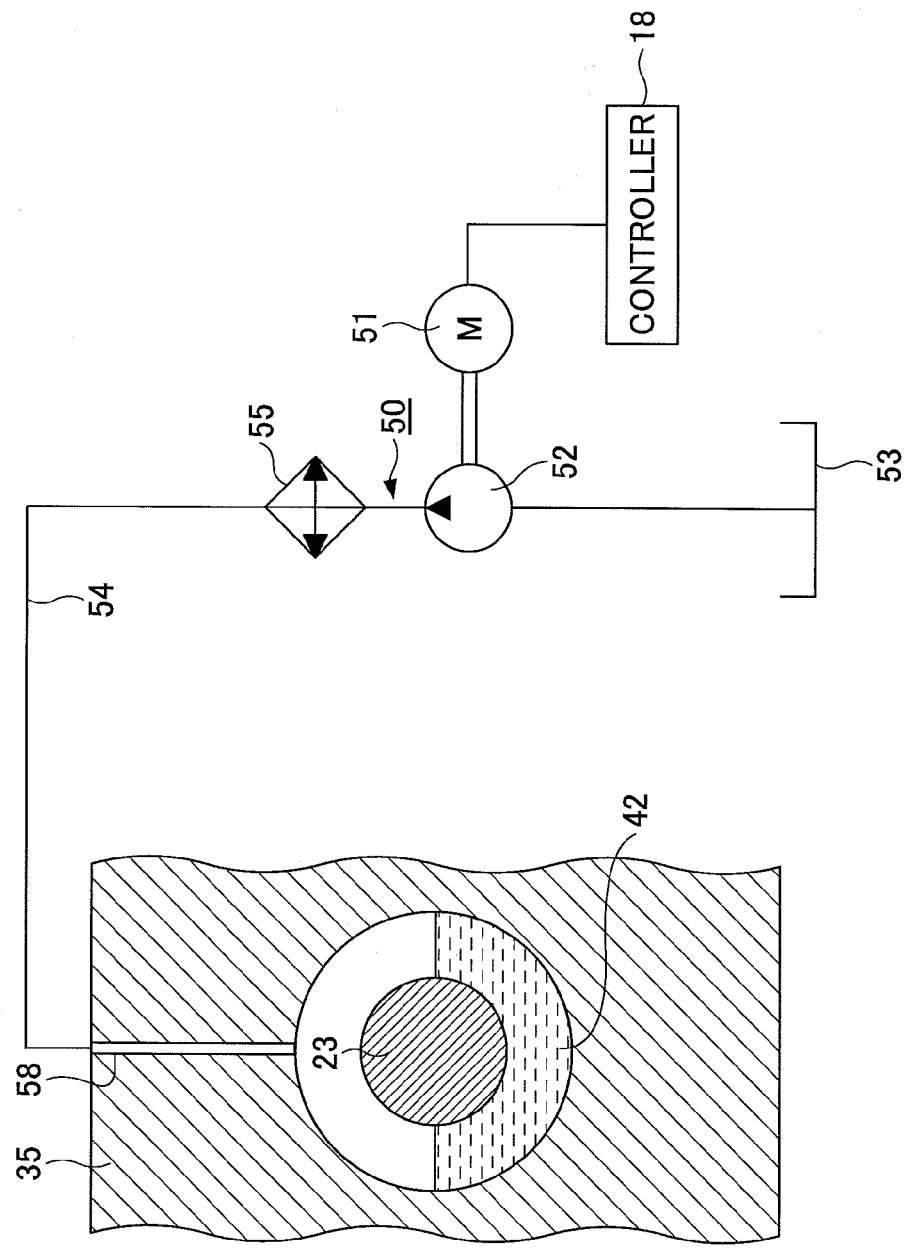
FIG. 9 is a cross-sectional view taken along line IX-IX of FIG. 8.

FIG. 8, which is a cross-sectional view illustrating a main part of an injection molding machine according to another embodiment of the present invention, corresponds to the cross-sectional view of FIG. 2. FIG. 9 is a cross-sectional view taken along line IX-IX of FIG. 8.

Figure 10:
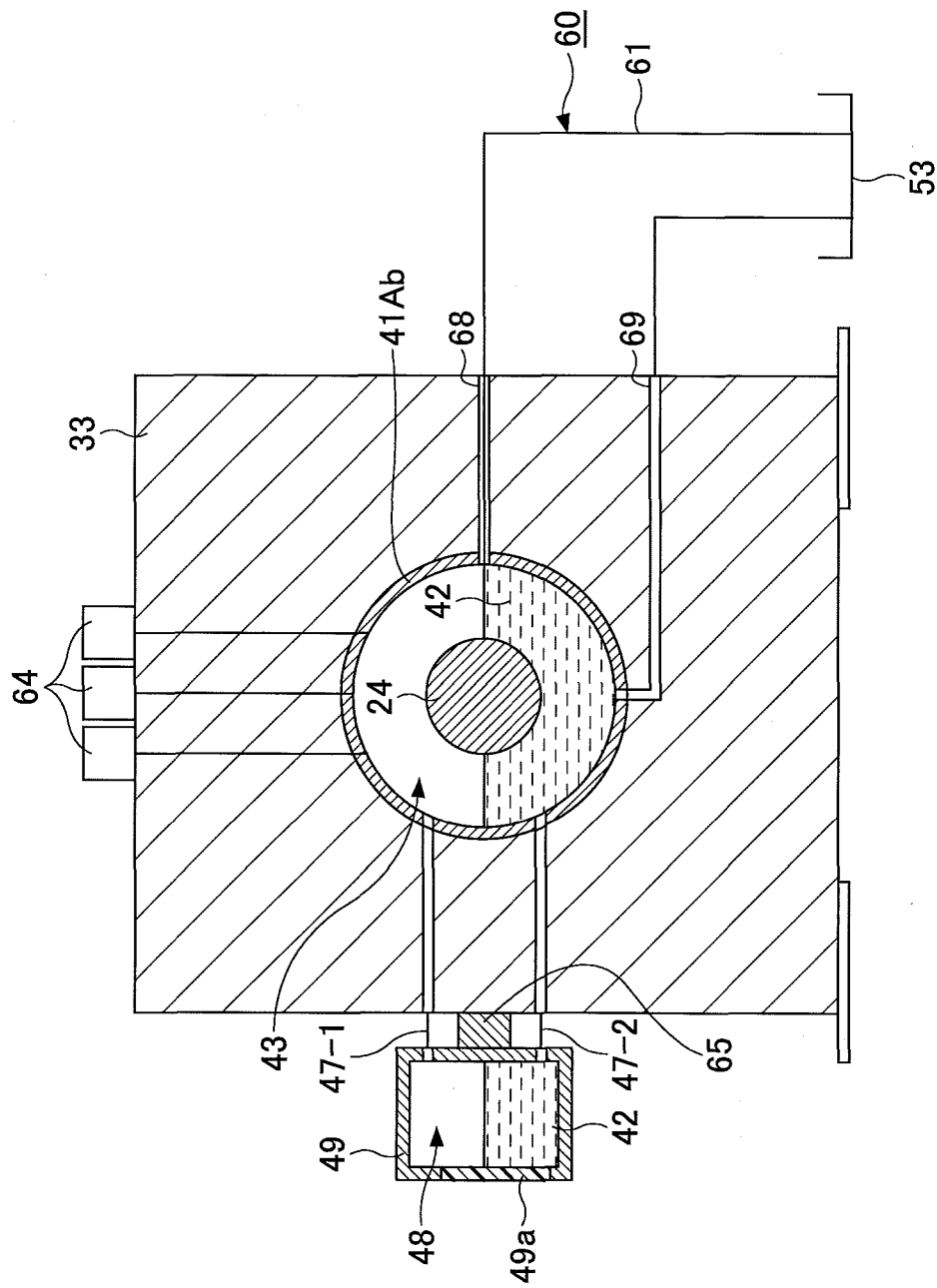
FIG. 10 is a cross-sectional view taken along line X-X of FIG. 8.

FIG. 10 is a cross-sectional view taken along line X-X of FIG. 8. A discharge part, a detection container, and a gas feed/discharge valve are illustrated in FIG. 10.

As illustrated in FIGS. 7-10, one end part of an expandable/retractable member 41A is attached to the rear side support 33 whereas another end part of the expandable/retractable member 41A is attached to the pressure plate 35. The expandable/retractable member 41A expands and retracts in correspondence with the space formed between the rear side support 33 and the pressure plate 35. In this embodiment, the rear side support 33 is an example of a first attachment member, and the pressure plate 35 is an example of a second attachment member. Alternatively, the rear side support 33 may be the second attachment member, and the pressure plate 35 may be the first attachment member. This embodiment may be similarly applied to the embodiment illustrated in FIG. 2.

In order to prevent scattering of the lubricating oil 42, the expandable/retractable member 41A may be formed in a cylindrical shape that encompasses a peripheries of the drive shaft 23 and the rotation shaft 24. In this embodiment, the rotation shaft 24 is an example of a first friction member, and the drive shaft 23 is an example of a second friction member. Alternatively, the rotation shaft 24 may be the second friction member, and the drive shaft 23 may be the first friction member. This embodiment may be similarly applied to the embodiment illustrated in FIG. 2.

The expandable/retractable member 41A may be a telescopic type. The expandable/retractable member 41A may include a moving side cylinder part 41Aa attached to the pressure plate 35 provided on a movable side of the expandable/retractable member 41A. The expandable/retractable member 41A may also include a fixed side cylinder part 41Ab attached to the rear side support 33 provided on a fixed side of the expandable/retractable member 41A.

The moving side cylinder part 41Aa may be attached to the rear side support 33 from a rear side of the rear side support 33 by inserting the moving side cylinder part 41Aa into a through-hole of the rear side support 33 from the rear side of the rear side support 33. Thereby, work efficiency is facilitated. Although the rear side support 33 may retain the shaft bearing 38 of the rotation shaft 24 (see FIG. 2) by way of the fixed side cylinder part 41Ab, the shaft bearing 38 of this embodiment is provided in the speed reducer 25 illustrated in FIG. 1.

A space formed between the fixed side cylinder part 41Ab and the rotation shaft 24 is sealed by a sealing member 57A.

The expandable/retractable member 41A forms a reservoir space 43 for storing lubricating oil 42 in the peripheries of the drive shaft 23 and the rotation shaft 24. The lubricating oil 42 can be retained between the drive shaft 23 and the rotation shaft 24.

An oil storage tank 63 for storing the lubricating oil 42 that leaks out from the expandable/retractable member 41A may be provided at a lower side of the expandable/retractable member 41A. The oil storage tank 63 may be formed as a part of the base 31 or formed on an upper surface of the base 31. The oil storage tank 63 stores, for example, the lubricating oil 42 that leaks from an area between the moving side cylinder part 41Aa and the fixed side cylinder part 41Ab.

A feed port 58 is provided in the pressure plate 35 (see FIG. 9). A discharge port 68 is provided in the rear side support 33 (see FIG. 10). The feeding part 50 is connected to the feed port 58. The discharge part 60 is connected to the discharge port 68. The lubricating oil 42 fed from the feed port 58 travels through the reservoir space 43 and is discharged from the discharge port 68. The lubricating oil 42 carries a large amount of heat to the outside to provide a satisfactory cooling efficiency.

After the lubricating oil 42 fed from the feed port 58 lubricates the shaft bearings 36, 37 of the drive shaft 23, the lubricating oil 42 may be fed to the reservoir space 43 and then discharged from the discharge port 68. Because the lubricating oil 42 having a relatively low temperature lubricates the shaft bearings 36, 37, the shaft bearings 36, 37 can be prevented from being overheated.

In this embodiment, the shaft bearing 38 illustrated in FIG. 2 is provided in the speed reducer 25. However, the flow of the lubricating oil 42 may be the same as this embodiment even in the above-described case where the rear side support 33 retains the shaft bearing 38 of the rotation shaft 24 by way of the fixed side cylinder part 41Ab or the above-described case where the rear side support 33 directly retains the shaft bearing 38 of the rotation shaft 24 as illustrated in FIG. 2. In other words, the lubricating oil 42 may lubricate the shaft bearing 38 of the rotation shaft 24 after the shaft bearings 36, 37 of the drive shaft 23 are lubricated by the lubricating oil 42. Unlike the shaft bearing 38 of the rotation shaft 24, the shaft bearings 36, 37 of the drive shaft 23 receives thrust load from the screw 13 provided on the front side. Because the drive shaft 23 and the rotation shaft 24 are splined to each other, hardly any thrust load is exerted to the shaft bearing 38 of the rotation shaft 24 provided on the rear side. Because the shaft bearings 36, 37 are lubricated before lubricating the shaft bearing 38, the shaft bearings 36, 38 receiving a large thrust load can be cooled by the lubricating oil 42 having a lower temperature compared to a case of lubricating the shaft bearings 36, 37 after lubricating the shaft bearing 38. Therefore, the shaft bearings 36, 37, which tends to be heated to a high temperature, can be prevented from being overheated. Alternatively, the positions of the feed port 58 and the discharge port 60 may be reversed. Alternatively, the feed port 58 may be provided in the rear side support 33, and the discharge port 68 may be provided in the pressure plate 35. However, from the standpoint of preventing overheating of the shaft bearings 36, 37, it is preferable to provide the feed port 58 in the pressure plate 35 and provide the discharge port 68 in the rear side support 33 as described above.

The detection container 49, a gas feed/discharge valve 64, and a discharge port used for maintenance (maintenance discharge port) 69 may be provided in the rear side support 33 as illustrated in FIG. 10.

The detection container 49 may be attached to a bracket 65 of the rear side support 33. Piping may be provided between the detection container 49 and the rear side support 33. The detection space 48 and the reservoir space 43 are in communication by way of flow paths 47-1, 47-2 of the piping. The detection container 49 may include a transparent window 49a that allows the liquid level of the lubricating oil 42 to be visible. The liquid level of the lubricating oil 42 of the detection space 48 corresponds to the liquid level of the lubricating oil 42 of the reservoir space 43.

The gas feed/discharge valve 64, which is attached to an upper part of the rear side support 33, feeds/discharges gas (air) in correspondence with the changes of the liquid level of the lubricating oil 42. Thereby, the gas feed/discharge valve controls the changes of the atmospheric pressure inside the reservoir space 43. In a case where the atmospheric pressure inside the reservoir space 43 is higher than a predetermined pressure, the gas feed/discharge valve discharges air from the reservoir space 43. In a case where the atmospheric pressure inside the reservoir space 43 is lower than a predetermined pressure, the gas feed/discharge valve feeds air to the reservoir space 43. The gas feed/discharge valve 64 includes, for example, an air breather. Alternatively, multiple small-sized air breathers may be attached to the gas feed/discharge valve. Thereby, the width and height of the gas feed/discharge valve 64 can be reduced.

It is to be noted that the area for attaching the gas feed/discharge valve 64 is not limited to the upper part of the rear side support 33. For example, the gas feed/discharge valve 64 may be attached to one or more of the upper part of the rear side support 33, an upper part of the expandable/retractable member 41A, and an upper part of the pressure plate 35.

The maintenance discharge port 69, which is provided in the rear side support 33, discharges the lubricating oil 42 of the reservoir space 43 from an area lower than the discharge port 68 used for adjusting liquid level. A large portion of the lubrication oil 42 can be discharged from the maintenance discharge port 69. Thereby, a maintenance operation can be facilitated. The maintenance discharge port 69 is normally closed but is opened during maintenance.

It is to be noted that the area for providing the maintenance discharge port 69 is not limited to the rear side support 33. For example, the maintenance discharge port 69 may be provided in one or more of the rear side support 33, the expandable/retractable member 41A, and the pressure plate 35.

Although this embodiment describes the flow of the lubricating oil 42 of the reservoir space 43 formed in the peripheries of the drive shaft 23 and the rotation shaft 24, the flow of the lubricating oil 142 of the reservoir space 143 formed in the peripheries of the ball screw shaft 27a and the ball screw nut 27b may be the same as the flow of the lubricating oil 42 in this embodiment. In this embodiment, the ball screw shaft 27a is an example of the first friction member, and the ball screw nut 27b is an example of the second friction member. Alternatively, the ball screw shaft 27a may be the second friction member, and the ball screw nut 27b may be the first friction member. This embodiment may be similarly applied to the embodiment illustrated in FIG. 5.

For example, the front side support 32 may be provided in the feed port, and the pressure plate 35 may be provided in the discharge port. In this case, the front side support 32 is an example of the first attachment member, and the pressure plate 35 is an example of the second attachment member. Alternatively, the front side support 32 may be the second attachment member, and the pressure plate 35 may be the first attachment member. This embodiment may be similarly applied to the embodiment illustrated in FIG. 5.

The lubricating oil 142 fed from the feed port of the front side support 32 travels through the reservoir space 143 and is discharged from the discharge port of the pressure plate 35. The lubricating oil 142 carries a large amount of heat to the outside to provide a satisfactory cooling efficiency. After the lubricating oil 142 lubricates the ball screw mechanism 27, the lubricating oil 142 may lubricate the shaft bearings 136, 137 of the shaft part 28.

It is to be noted that, in a case where the positions of the ball screw mechanism 27 and the shaft bearings 136, 137 are reversed, the positions of the feed port and the discharge port may also be reversed. In other words, in a case where the ball screw nut 27b is attached to the pressure plate 35 whereas the shaft bearings 135, 137 are retained by the front side support 32, the feed port may be provided in the pressure plate 35 and the discharge port may be provided in the front side support 32. The lubricating oil 142 lubricates the shaft bearings 136, 137 after the lubricating the ball screw mechanism 27.

Alternatively, the lubricating oil 142 may lubricate the ball screw mechanism 27 after lubricating the shaft bearings 136, 137. The positions of the feed port and discharge port may be arbitrarily set according to, for example, the type of friction member or the type of shaft bearing.

According to the above-described embodiment, there is provided an injection molding machine that can retain a lubricating oil between friction members.

The present invention is disclosed with reference to the preferred embodiments. However, it should be understood that the present invention is not limited to the above-described embodiments, and variations and modifications may be made without departing from the scope of the present invention.

For example, although the injection molding machine 10 of the above-described embodiment is an in-line screw type injection molding machine, the injection molding machine 10 may be a screw preplasticating type injection molding machine. With the screw preplasticating type injection molding machine, a molding material, which is melted in a plasticizing cylinder, is fed to an injection cylinder and injected from the injection cylinder to the mold unit 87. Because the plasticizing cylinder and the injection cylinder are provided separately, a screw provided in the plasticizing cylinder can be driven to rotate during a filling process or a hold pressure process.

Further, although the expandable/retractable member 41, 41A, 141 of the above-described embodiment is a telescopic type, other types such as a bellows type may be used as the expandable/retractable member 41, 41A, 141 as long as the type is expandable and retractable.

In the above-described embodiment, the reservoir space that stores the lubricating oil is formed in the periphery of the ball screw mechanism 27 that converts the rotating movement of the injection motor 16 to a linear movement. However, the reservoir space that stores the lubricating oil may be formed in the periphery of the ball screw mechanism 97 that converts the rotating movement of the mold clamping motor 96 to a linear movement. In this case, one end part of the expandable/retractable member is attached to the toggle support 83 whereas the other end part of the expandable/retractable member is attached to the cross-head 91.

Further, in the above-described embodiment, the lubricating oil lubricates the area between the ball screw shaft 27a and the ball screw nut 27b, the lubricating oil may lubricate a screw shaft and a nut that fasten without using a ball.

What is claimed is:

1. An injection molding machine, comprising:
   a first friction member;
   a second friction member, the first and second friction members being connected to move relative to each other;
   a screw coupled to one of the first friction member and the second friction member;
   a base;
   a plasticizing motor coupled to the other of the first friction member and the second friction member, the plasticizing motor configured to rotate the screw, the plasticizing motor not being movable relative to the base;
   an expandable/retractable member provided in a periphery of the first and second friction members and including first and second end parts;
   a first attachment member attached to the first end part;
   a second attachment member attached to the second end part, one of the first and second attachment members being fixed to the base, the other of the first and second attachment members being movable with respect to the base along an axial direction of the screw; and an injection motor configured to move the screw with respect to the base by way of the one of the first and second friction members coupled to the screw, the injection motor being fixed to the other of the first and second attachment members movable with respect to the base along the axial direction of the screw, the injection motor being configured to move together with the other of the first and second attachment members movable with respect to the base along the axial direction of the screw, wherein a lubricating oil is fed to an area between first and second friction members, wherein a position of the second attachment member relative to the first attachment member is displaced in cooperation with a position of the second friction member relative to the first friction member, wherein the expandable/retractable member is configured to form a reservoir space that stores the lubricating oil in the periphery of the first and second friction members, wherein the expandable/retractable member is configured to expand/retract in correspondence with an interval between the first and second attachment members.

2. The injection molding machine as claimed in claim 1, further comprising:

a feeding part configured to feed the lubricating oil to the reservoir space.

3. The injection molding machine as claimed in claim 1, further comprising:

a discharge part configured to discharge the lubricating oil from the reservoir space to outside of the injection molding machine.

4. The injection molding machine as claimed in claim 1, further comprising:

a detection part configured to detect an amount of the lubricating oil in the reservoir space.

5. The injection molding machine as claimed in claim 4, further comprising:

an output part configured to output an alarm based on a detection result of the detection part.

6. The injection molding machine as claimed in claim 4, further comprising:

a controller configured to control the amount of the lubricating oil in the reservoir space based on a detection result of the detection part.

7. The injection molding machine as claimed in claim 1, wherein a feed port is provided in one of the first and second attachment members and a discharge port is provided in the other one of the first and second attachment members, wherein the lubricating oil that is fed from the feed port passes through the reservoir space and is discharged from the discharge port.

8. The injection molding machine as claimed in claim 1, wherein the plasticizing motor is coupled to the first friction member, and the first attachment member is fixed to the base.

* * * * *